Patented July 17, 1951

2,560,682

UNITED STATES PATENT OFFICE 2,560,682

ROTOR AND ROTOR BLADE CONTROL APPARATUS FOR HELICOPTERS

Witold Brzozowski, Westmount, Montreal, Quebec, Canada, assignor to Stefan Czarnecki, Walden, N. Y.

Application December 16, 1946, Serial No. 716,559

10 Claims. (Cl. 170—160.26)

This invention relates to helicopters and more particularly to the construction of the rotor and the controls for regulating the pitch and the feathering of the rotor blades. The construction is primarily for jet-operated helicopters in which the power is developed by the reaction of a jet discharged from each blade of the rotor. Such helicopters require a special rotor hub construction that is capable of delivering gas under some pressure to the rotor blades, but the rotor does not have to transmit mechanical power to the blades.

One object of the invention is to provide an improved construction for securing the bearing housings of the rotor blades to a center frame of the rotor, and to obtain a simplified construction for adjusting the pre-conic angle of the blades.

Another object is to provide control apparatus for feathering the rotor blades. One feature relates to the pitch control, and in the preferred embodiment of the invention a special control construction obtains feathering of the rotor blades with the same structure that gives the collective pitch control for the blades.

Other objects, features and advantages of the invention will appear or be pointed out as the description proceeds.

In the drawing, forming a part hereof, in which like reference characters indicate corresponding parts in all the views.

Figure 2:
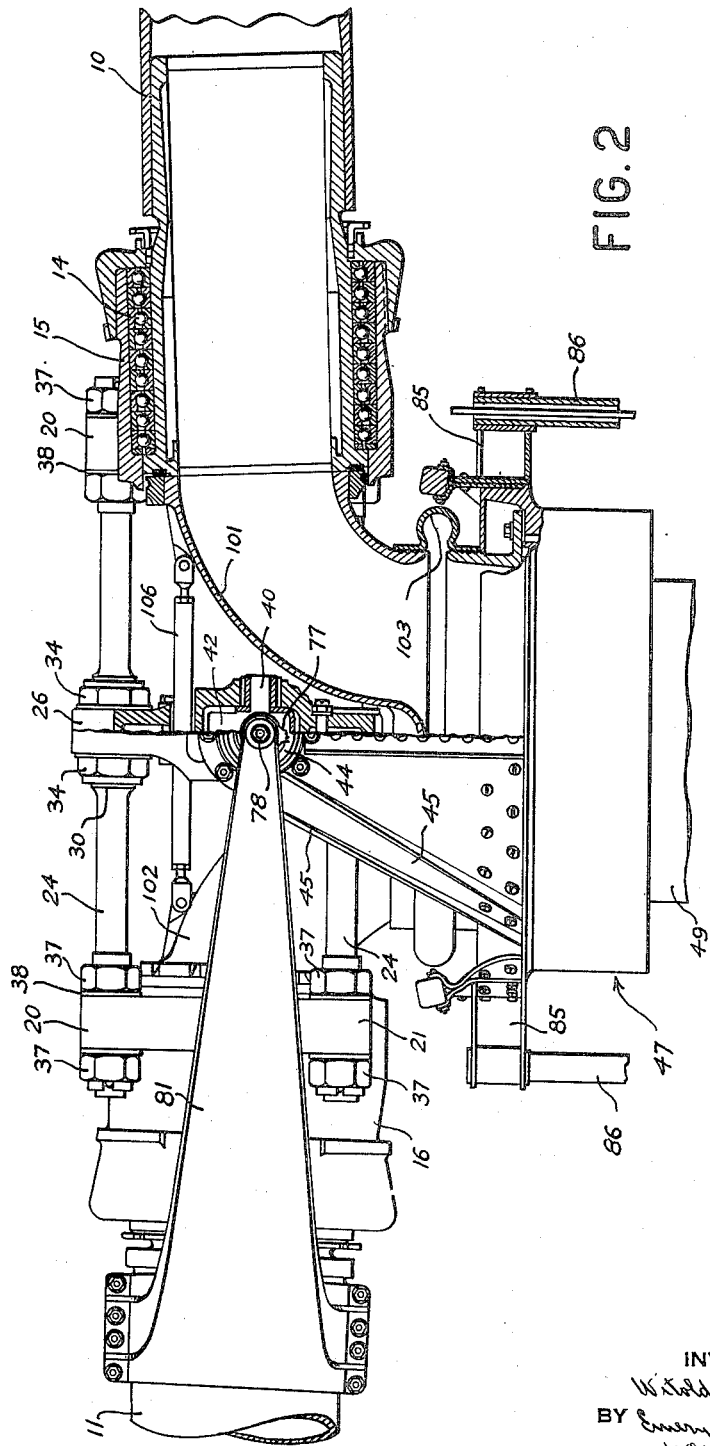
Figure 2 is an enlarged side view, partly in elevation and partly in section, showing the upper portion of the apparatus illustrated in Fig. 1 when viewed at right angles to Fig. 1.

Figure 2 shows rotor blades 10 and 11 extending from the rotor hub in opposite directions. The inner end of the blade 10 is held in ball bearings 14 in a housing 15. The inner end of the rotor blade 11 is held in similar bearings in a housing 16.

Each of the housings 15 and 16 has two lugs 20 extending from the upper portion of the housing and has two lugs 21 extending from the housing at a lower level. There are rigid bars or connectors 24 extending from each of the lugs 20 and 21 of the housing 15 to the corresponding lugs on the housing 16. These connectors 24 extend through a center structure or frame 26 and serve to connect the housings 15 and 16 to the center frame 26.

Figure 5:
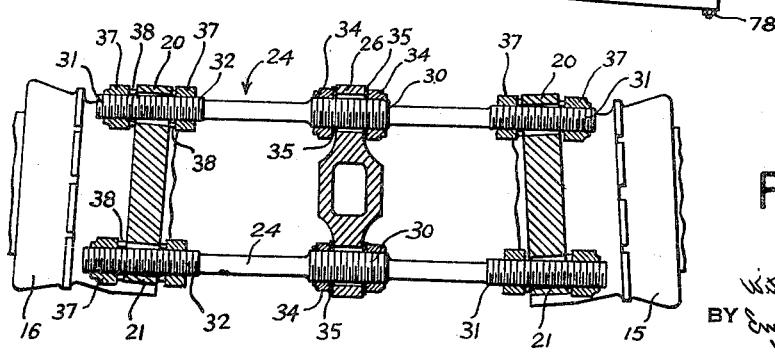
Figure 5 is a sectional view, on the line 4—4 of Fig. 1, showing the way in which the preconic angle of the blades is adjusted by the rigid connecting bars shown in Figure 1.

Figure 5 shows the way in which the housings 15 and 16 are connected to the center frame 26 in such a way that the pre-conic angle of the rotor blades can be changed. Each of the connectors 24 has a threaded mid-section 30 that extends through an opening in the center frame 26; and each of the connectors 24 has threaded end sections 31 and 32 extending through the lugs 20 and 21 of the housings 15 and 16 respectively. Nuts 34 on the threaded mid-sections 30 clamp against opposite faces of the center frame 26, with washers 35 interposed between the nuts 34 and frame 26.

There are nuts 37 on opposite sides of each of the lugs 20 and these nuts clamp washers 38 against the faces of the lugs 20. Similar nuts 37 clamp washers 38 against opposite side faces of the lower lugs 21.

The openings in the lugs 20 and 21 through which the connectors 24 extend are larger in diameter than the threaded portions of the connectors so that these openings can be tilted at an angle to the axes of the connectors as shown in Figure 5. The pre-conic angle of the rotor blades can be adjusted by moving the nuts 37 on the upper connectors 24 closer to or further from the center frame 26, or by similarly moving the nuts 37 on the lower connectors 24 or by moving the nuts 37 on the upper and lower connectors in opposite directions.

In order to obtain a firm clamping action when the lugs 20 and 21 are not at substantial right angles to the axes of the connectors 24, it is necessary to have the washers 38 of generally trapezoidal longitudinal cross section. Different washers can be used for different pre-conic angles, it being known before selecting the washers what particular angle the structure is to be adjusted for; or two washers can be used under each of the nuts 37 with the sloping faces of the washers equal and facing one another so that by turning the washers with respect to one another the desired angularity can be obtained for the washer faces that contact with the lug and nut. The center frame openings through which the connectors 24 extend are of larger diameter than the connectors to permit a limited up and down movement of the connectors 24 with changes in the pre-conic angle of the rotor blades.

The center frame 26 has bearings that rock on a trunnion 40 located at substantially the middle point of a cross link 42. This cross link 42 has its opposite ends held by bearings 44 at the upper end of bearing supports 45 which form an integral part of a rotor hub 47. The bearings 44 are in substantial alignment so that the cross link 42 is free to rock transversely of its length.

The rotor hub 47 rotates on suitable bearings 48 on a pylon 49 which has a flange 50 at its lower end for integrally connecting the pylon with the body of a helicopter.

A spherical bearing element 55 surrounds the lower portion of the pylon and can be moved vertically along the pylon by a yoke 56 operatively connected with extension 57 that project downward from the spherical bearing element 55 on opposite sides of the pylon. The yoke 56 is rocked about a pivot 59 by a control lever 60. The pivot 59 is supported from the pylon, below the spherical bearing element 55 by a bracket 62 rigidly secured to the outside of the pylon.

There is a frame 65 surrounding the spherical bearing 55. This frame 65 has rollers 67 located in upper and lower rows around the spherical bearing element 55 and spaced sufficiently far apart so that the spherical bearing element 55 prevents the frame 65 from moving either upward or downward independently of the bearing element 55. Operation of the control lever 60 to shift the spherical bearing element 55 vertically along the pylon, however, causes the frame 65 to move vertically as a unit with the bearing element 55.

Because of the spherical shape of the bearing element 55, the frame 65 is free to rock about a horizontal axis, and the rollers 65 merely roll along the spherical surface of the bearing element 55 during such rocking movement. The spacing between the upper and lower rows of rollers 67 is substantially less than the vertical extent of the spherical bearing surface. This is necessary in order to provide bearing surfaces over which the rollers 67 can travel to permit tilting of the frame 65.

The frame 65 is tilted into different angular positions on the spherical bearing element 55 by means of control rods 68 attached to brackets 69 extending down from the lower end of the frame 65. These control rods 68 hold the frame 65 in any desired angular position and they are operated by manual actuators under the control of the operator of the helicopter.

There is a bearing race 70 around the outside of the frame 65 and a ring 72 rotates about the frame 65, with ball bearings 73 interposed between the race 70 and a complementary race on the inside face of the ring 72. There are lugs 75 extending from opposite sides of the ring 72.

The lugs 75 are connected with the lower ends of control links 77 which extend upward to pivot connections 78 and 79 located on or substantially on the axis of the bearings 44 on which the cross link 42 rocks. The pivot connection 78 connects one of the control links 77 with one end of a crank 81 which is rigidly connected at its other end with the rotor blade 11; and the pivot connection 79 connects the other control link 77 with one end of a crank 82 that is secured at its other end to the rotor blade 10.

Vertical movement of the frame 65 and the spherical bearing element 55 as a unit causes both of the control links 77 to move upward or downward for equal distances and this movement shifts both of the cranks 81 and 82 through equal angles and changes the angle of attack of both of the rotor blades 10 and 11 simultaneously. This is the collective pitch control for the rotor blades.

Rocking of the frame 65 on the spherical bearing 55 causes the control links 77 to move in opposite directions so that the cranks 81 and 82 turn the rotor blades in different directions. Since the ring 72 turns as a unit with the rotor hub and blades, the elevation of every point of the ring, when the ring is not at right angles to the axis of rotation of the rotor, changes progressively through a cycle during each revolution, and the control links 77 move up and down and cause the rotor blades to feather.

Brackets 85 extending from opposite sides of the rotor hub 47 are rigidly connected with pipes 86 extending downward along the sides of the pylon. The pipes 86 support brush holders 88 and there are brushes 89 at the inner ends of the holders 88 in position to bear against conductor rings 90 on the outside of the pylon.

Figure 1:
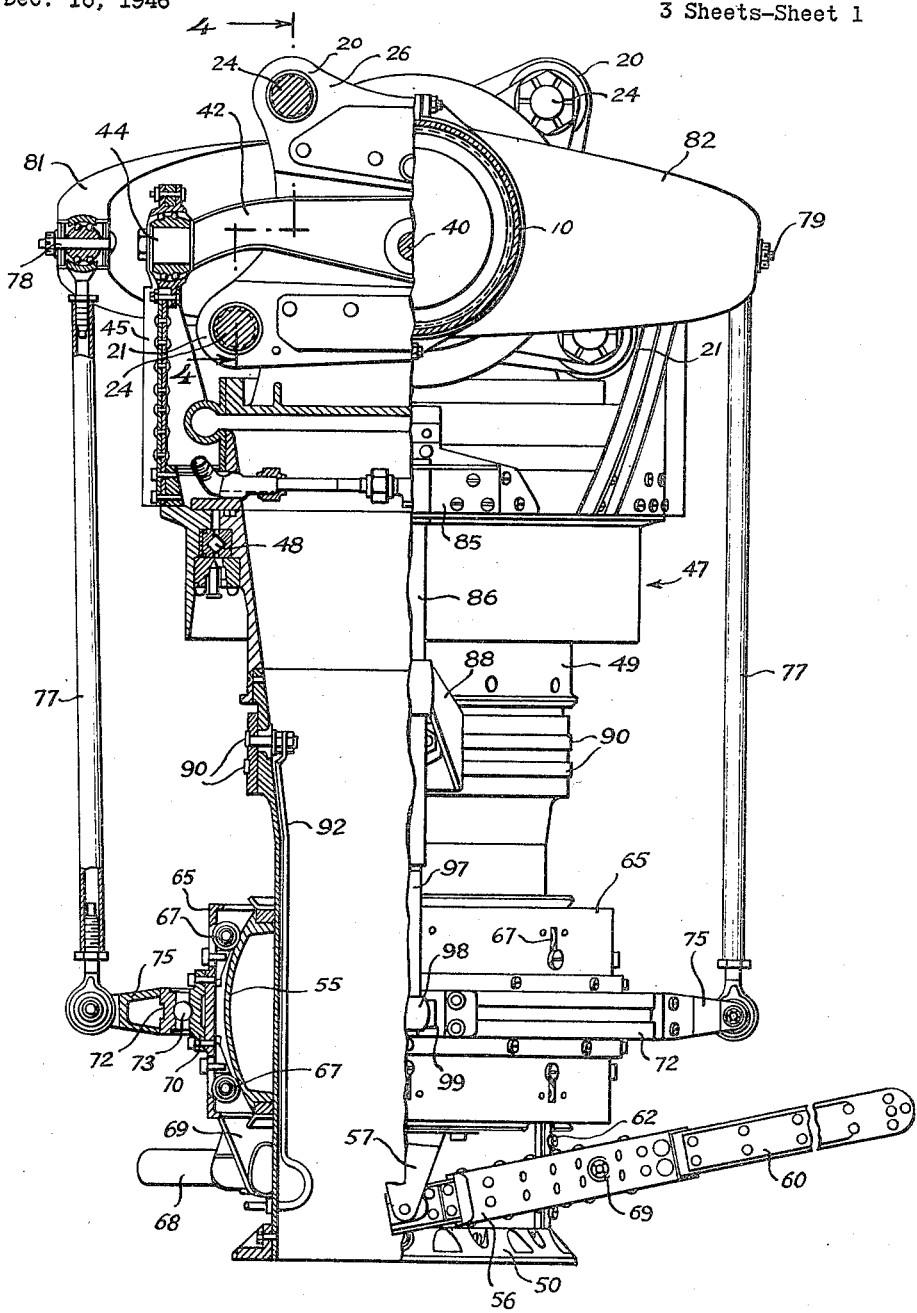
Figure 1 is an end view, partly in elevation and partly in section, of a helicopter rotor hub and pylon with control apparatus embodying this invention.
Figure 3:
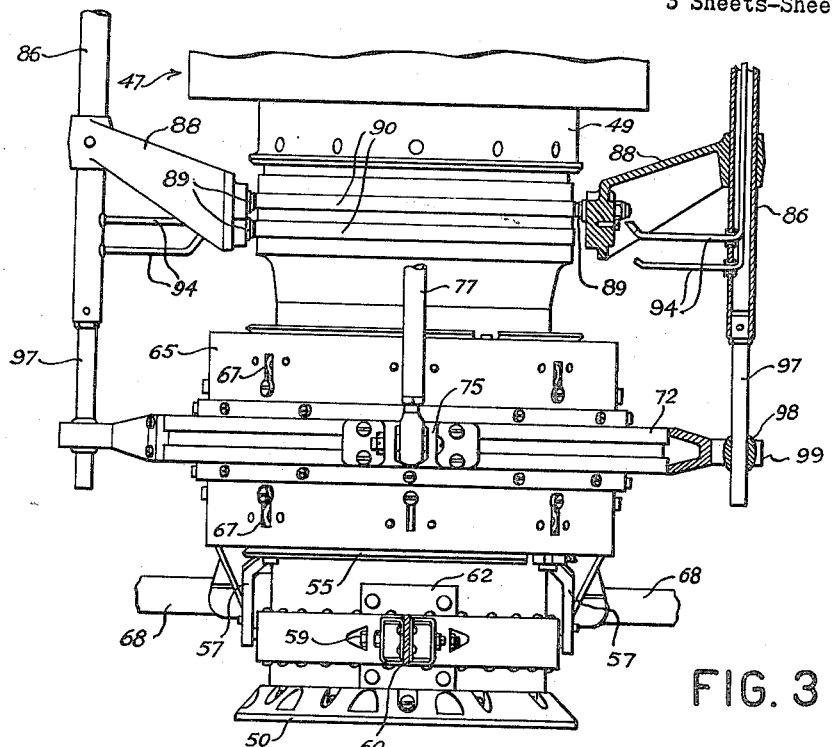
Figure 3 is an enlarged side elevation showing the pylon and the lower portion of the control apparatus of the helicopter rotor shown in Fig. 1.
Figure 4:
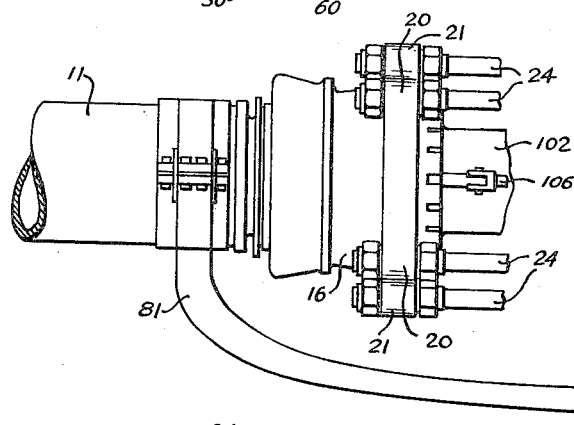
Figure 4 is a reduced scale, top plan view of a portion of the control mechanism shown in Figure 1.

The conductor rings 90 are supplied with power from wires 92 (Fig. 1) extending up through the interior of the pylon 49. The brushes 89 (Fig. 3) connect with wires 94 which extend into the pipes 86 and upward through these pipes and out of the open upper ends of the pipes to the rotor blades in which the wires connect with igniter apparatus which forms no part of this invention.

The pipes 86 which support the brush holders 88 also serve as connections for rotating the ring 72. At the lower end of each of the pipes 86 there is a rod 97 rigidly connected to the bottom portion of the pipe 86 and extending through a self-aligning bearing 98 in an extension 99 on each diametrically opposite side of the ring 72. Since the pipes 86 are rigidly connected with the rotor hub 47 by the brackets 85, they cause the ring 72 to rotate with the rotor hub.

At the upper end of the pylon (Fig. 2) there are elbows 101 and 102 connected with the pylon by an expansion joint 103. These elbows 101 and 102 put the rotor blades 10 and 11 in communication with the interior of the pylon so that compressed gas passing up through the pylon enters the respective rotor blades to provide the propelling jet for rotating the blades. The elbows 101 and 102 are connected together by a turnbuckle 106 which is adjustable to change the relative positions of the elbows 101 and 102 when the rotor is adjusted for a different pre-conic angle.

The preferred embodiment of this invention has been illustrated and described, but changes and modifications can be made, and some features of the invention can be used in different combinations without departing from the invention as defined in the claims.

What is claimed is:

1. A helicopter construction comprising a pylon, a bearing on the pylon, a rotor hub that rotates on said bearing, other bearings on opposite sides and near the upper end of the hub, a link extending across the hub and having its ends held by said bearings for rocking movement transverse of the length of said link, a frame, center bearings in the mid-region of the link supporting the frame for rocking movement about an axis transverse of the link so that the frame has universal movement with respect to the hub, separate housings on opposite sides of the rotor hub for holding the ends of the rotor blades; and a plurality of rigid bars at least some of which are vertically spaced from one another and connected to the frame, said bars extending from opposite sides of the frame and supporting said housings at preselected orientation and spacing with respect to one another and to the center frame.

2. A helicopter rotor comprising a center frame, housings for holding the ends of rotor blades, rigid bars extending through the center frame and from opposite sides of the center frame through openings in said housings, fastenings for connecting the rigid bars to the center frame and for connecting the housings to opposite ends of the bars, the openings in said housings being larger than the bars so that the axes of the openings can be tilted with respect to the bars to permit adjustment of the pre-conic angle of the rotor blades.

3. Apparatus for connecting helicopter rotor blades with a rotor hub, said apparatus comprising a center frame, bars extending substantially horizontally from the center frame at different levels, housings for holding the inner ends of rotor blades, each of said housings having portions with openings for receiving the outer ends of the connecting bars, and each of the connecting bars having threads on the end portions that extend through the housings, nuts on the connecting bars at the opposite ends of the openings in the housing, the nuts on the bars at different levels being separately adjustable to shift the angular positions of the housings with respect to the bars and thus adjust the pre-conic angle of the rotor blades.

4. A helicopter rotor including a center frame, housings for the inner ends of the rotor blades, devices for connecting the housings to the center frame, said devices comprising a number of connectors between each of the housings and the center frame, and said connectors being at different horizontal levels, and means for changing the effective length of the connectors that are at different levels so as to tilt the housings and change the pre-conic angle of the rotor blade.

5. A helicopter rotor including a center structure, rigid connectors attached to the center structure and extending outward from said structure, some of said connectors being at different horizontal levels than others, and each of said connectors having a threaded portion at its outward end, housing located on opposite sides of said center structure for holding the ends of rotor blades, said housings being held in spaced relation to the center structure and to each other by said connectors, the housings having portions with openings at different horizontal levels in position to receive the threaded end portions of said connectors, and nuts on the threaded end portions of the connectors for securely clamping the connecting portions of the housings to said rigid connectors.

6. A helicopter rotor construction comprising housings spaced from one another and in position for holding the inner ends of the blades of the rotor, openings in said housings at different levels, a center frame structure midway between said housings, rigid connecting bars of smaller cross section than the openings in said housings extending in opposite directions from the center frame structure to said openings in the housings, means on the connectors for clamping against surfaces of the housings, said means including washers of trapezoidal longitudinal section for holding the housings with the axes of their openings out of line with the axes of said connectors.

7. A helicopter rotor construction including a center frame structure, housings for holding the ends of rotor blades, rigid connectors extending from the center frame structure toward each of said housings, said rigid connectors being at different horizontal levels and having threaded portions at their outer ends, lugs on each housing with openings in position to receive the threaded ends of said connectors, said openings being substantially larger in diameter than the threaded end portions of the connectors, nuts on the threaded end portion of each connector on opposite sides of the lug through which the connector extends, and washers of generally trapezoidal longitudinal cross section located between each of the nuts and the confronting face of the lug against which the nut clamps the washer.

8. A helicopter construction comprising a pylon, a rotor hub rotatable on the pylon, bearings at the upper end of the hub and on opposite sides thereof, a cross link with its opposite ends held in said bearings for rocking movement about an axis extending lengthwise of said link, a center frame, bearings in the mid-region of the link supporting the frame for rocking movement about an axis transverse of the link, rotor blades extending in opposite directions from the center frame, bearings for holding the ends of the rotor blades and in which the blades are movable for feathering, housings for the bearings of the respective blades, each of said housings having two lugs extending from the upper portion of the housings and two other lugs extending from the lower portion of the housings, four rigid connecting bars having threaded central portions and threaded end portions, each of said bars having its center portion extending through an opening in the center frame and its end portions extending through corresponding lugs of the housings for the blade bearings on opposite sides of the center frame, nuts on the threaded center portion of each bar clamping against opposite faces of the center frame for rigidly connecting the bar to the center frame, and other nuts on opposite sides of each of said lugs for clamping against said lugs to rigidly connect the housings to the respective bars, the openings through said lugs being larger than the threaded end portions of the bars so that the pre-conic angle of the rotor blades can be adjusted by relative shifting of the nuts on the upper and lower bars in opposite directions lengthwise of the bars.

9. The combination comprising a helicopter rotor including hollow blades, bearings in which the inner ends of the blades are rotatable for feathering, housings for the respective bearings, a center hub, and means connecting the housings to the center hub, a pylon with a bearing on which the hub turns, the pylon having a passage therein through which gas is supplied to the hub, conduits in the hub connecting the passage in the pylon with the inner end of each of the hollow blades, a separate crank connected with each of the rotor blades, at a region of the blade outward beyond the rotor hub, for rocking the blade in its bearing to change the pitch of the blade, a control ring rotatable with the rotor, a bearing on the pylon about which the ring rotates, connecting links on opposite sides of the pylon and pivotally connected with said ring at their lower ends and to the respective blade operating cranks at the upper ends of said links and control means for rocking the ring bearing into different angular positions with respect to the axis of rotation of the rotor to control the feathering of the rotor blades.

10. In a helicopter, a pair of hollow rotor blades, bearings in which the inner ends of the rotor blades are held, housings for said bearings, a center frame to which the housings are connected, a cross link with bearings adjacent its midsection holding the center frame for rocking movement about an axis transverse of the cross link, a rotor hub having bearings on opposite sides for receiving the ends of the cross link and holding the cross link for rocking movement about an axis extending lengthwise of the link a pylon with a bearing on which the hub turns, the pylon having a passage therein through which gas is supplied to the hub, conduits in the center hub connecting the passage in the pylon with the inner end of each of the hollow blades, a crank connected with one of the rotor blades at a region of the blade outward beyond the rotor hub, and extending around the housing on one side of the rotor, a similar crank connected with the other blades at a region of the blade outward beyond the rotor hub, and extending to a position in line with but beyond the other end of the cross link, control links connected with the respective cranks by pivot connections located substantially in line with the axis of rocking movement of the cross link, a ring to which the lower ends of the control links are pivotally connected on opposite sides of the pylon, a bearing surrounding the pylon and on which the ring is rotatable in unison with the rotor hub, and a control device for raising and lowering said bearing to shift the angle of attack of the rotor blades collectively.

WITOLD BRZOZOWSKI.

REFERENCES CITED

The following references are of record in the file of this patent:

UNITED STATES PATENTS

| Number | Name | Date |
|---|---|---|
| 1,682,893 | Cierva | Sept. 4, 1928 |
| 1,819,075 | Darr | Aug. 18, 1931 |
| 1,919,089 | Breguet | July 18, 1933 |
| 2,030,578 | Flettner | Feb. 11, 1936 |
| 2,074,342 | Platt | Mar. 23, 1937 |
| 2,169,849 | Pitcairn | Aug. 15, 1939 |
| 2,376,523 | Synnestvedt | May 22, 1945 |
| 2,396,038 | Bossi | Mar. 5, 1946 |
| 2,429,646 | Pullin | Oct. 28, 1947 |
| 2,432,441 | Pecker | Dec. 9, 1947 |